drum without any collapsing convergence of the walls of the shoe toward each other.

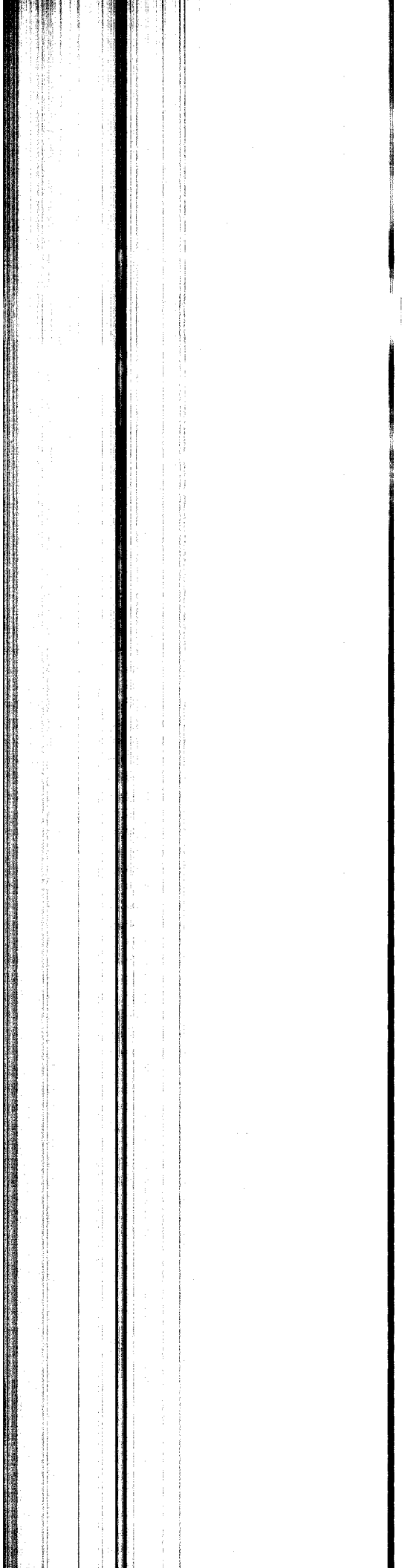

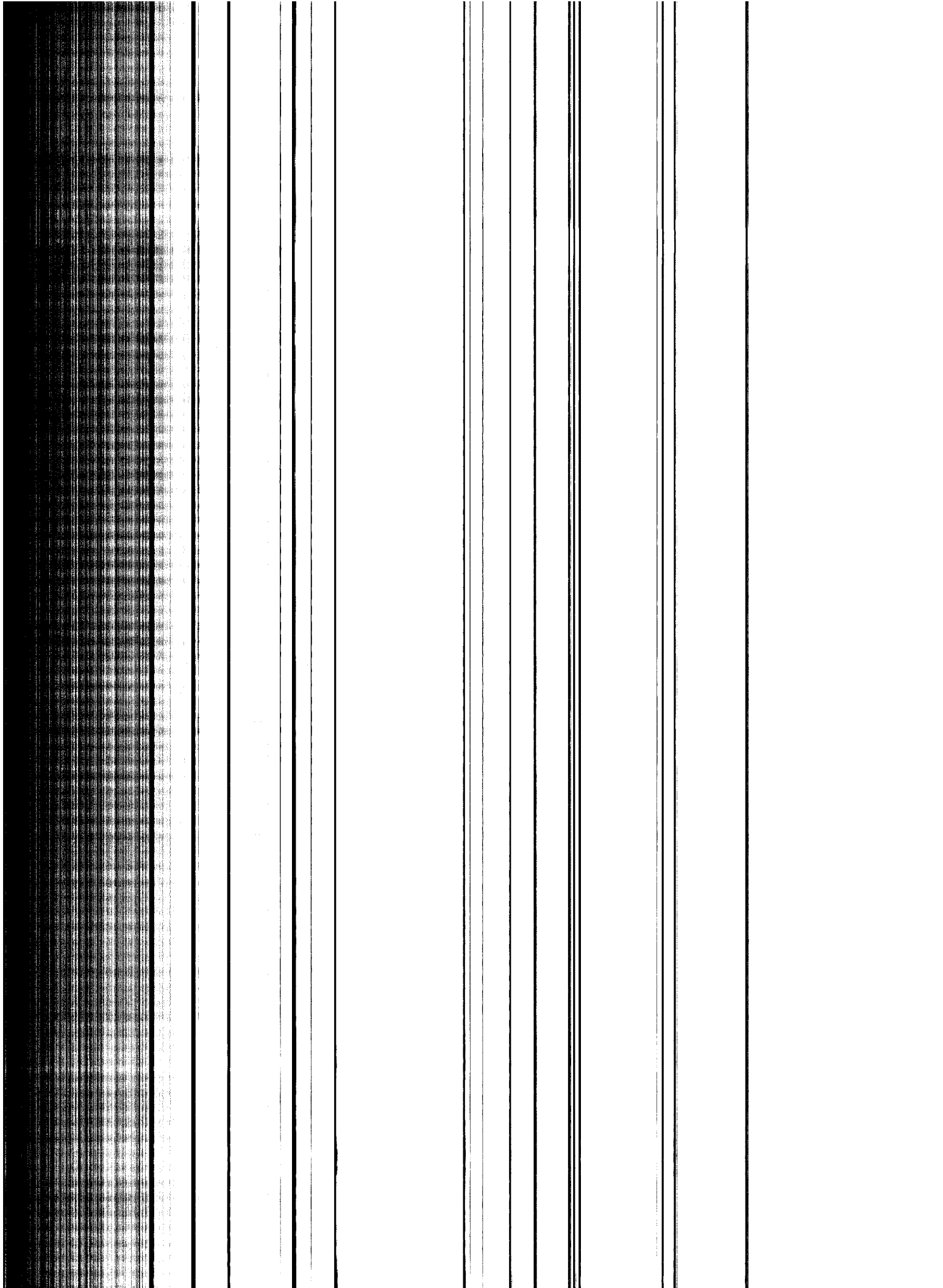

What is claimed is:

1. A bandless brake-shoe assembly including a set of arcuate, sheet-metal elements which are each bent to a V-section transversely and whose ends are provided with mounts in the hollows of the shoes, whereby the shoes are connected in train for circumferential tension when applied to a drum.

2. In a brake structure, a brake shoe of arcuate form and of V-shape cross-section throughout its length, and having the hollow outward; and means in the troughs of the ends for attachment of supporting and contracting means.

3. A brake structure of bandless form and consisting of shoe elements having contiguous extremities provided with mounts for an anchor device, and having mounts on the opposite extremities for attachment of contracting means; said shoes being of V-section throughout their length, with the valleys outward, and the mounts in the valley ends; the shoes constituting tension links in the brake.

FREDERICK W. SMITH.